(12) United States Patent
Wegelmann et al.

(10) Patent No.: US 9,010,858 B2
(45) Date of Patent: Apr. 21, 2015

(54) VEHICLE SEAT FOR A MOTOR VEHICLE

(71) Applicant: GM Global Technology Operations LLC, Detroit, MI (US)

(72) Inventors: Joerg Wegelmann, Bodenheim (DE); Joachim Ohlinger, Kriftel (DE); Guenter Fleckenstein, Kleinkahl (DE)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/799,771

(22) Filed: Mar. 13, 2013

(65) Prior Publication Data

US 2013/0300171 A1 Nov. 14, 2013

(30) Foreign Application Priority Data

May 11, 2012 (DE) .......................... 10 2012 009 591

(51) Int. Cl.
*B60N 2/02* (2006.01)
(52) U.S. Cl.
CPC ............. *B60N 2/0284* (2013.01); *Y10S 297/08* (2013.01)
(58) Field of Classification Search
USPC ........................................ 297/284.11, DIG. 8
See application file for complete search history.

(56) References Cited

U.S. PATENT DOCUMENTS

| | | | | |
|---|---|---|---|---|
| 3,554,599 A | * | 1/1971 | Pietschmann | 297/353 |
| 4,773,703 A | | 9/1988 | Krugener et al. | |
| 5,082,326 A | * | 1/1992 | Sekido et al. | 297/284.6 |
| 5,171,062 A | * | 12/1992 | Courtois | 297/340 |
| 5,370,444 A | * | 12/1994 | Stulik | 297/284.11 |
| 5,599,062 A | * | 2/1997 | Hagedorn et al. | 297/284.11 |
| 6,601,918 B2 | * | 8/2003 | Mattsson | 297/284.11 |
| 8,128,167 B2 | * | 3/2012 | Zhong et al. | 297/284.11 |
| 2008/0157577 A1 | * | 7/2008 | Lindsay | 297/284.11 |
| 2008/0157578 A1 | * | 7/2008 | Snyder | 297/311 |
| 2008/0191531 A1 | | 8/2008 | Hoffmann | |

FOREIGN PATENT DOCUMENTS

| | | |
|---|---|---|
| DE | 10009228 A1 | 9/2000 |
| DE | 102009057435 A1 | 6/2011 |
| DE | 102011116449 A1 | 4/2013 |
| JP | 2010279650 A | 12/2010 |

OTHER PUBLICATIONS

German Patent Office, German Patent Search Report for Application No. 1020120095910, dated Jan. 25, 2013.
GB Search Report for Application No. 1305458.0 dated Sep. 5, 2013.

* cited by examiner

*Primary Examiner* — Peter Brown
(74) *Attorney, Agent, or Firm* — Ingrassia Fisher & Lorenz, P.C.

(57) ABSTRACT

A vehicle seat, in particular for a motor vehicle, is provided. The vehicle seat includes a sitting part with a sitting surface, at least one air bellows arranged in the sitting part for altering the extent of the sitting surface in longitudinal direction of the vehicle seat and a back part. At least one guide element is arranged on the air bellows and is connected with the air bellows, and the guide element is movably mounted on at least one bearing part.

16 Claims, 4 Drawing Sheets

VEHICLE SEAT FOR A MOTOR VEHICLE

CROSS-REFERENCE TO RELATED APPLICATION

This application claims priority to German Patent Application No. 10 2012 009 591.0, filed May 11, 2012, which is incorporated herein by reference in its entirety.

TECHNICAL FIELD

The technical field relates to a vehicle seat and a motor vehicle including a vehicle seat.

BACKGROUND

Motor vehicles have vehicle seats to receive persons within an interior of the motor vehicle. The vehicle seat has a sitting part and a back part. The occupants on the vehicle seat have different sizes or respectively thigh lengths. For this reason, it is known to divide the sitting part of the vehicle seat into several sitting part elements and at least one sitting part element is movable here in the direction of a longitudinal direction of the vehicle seat with an air bellows which is able to be inflated by an air pump. Thereby, the extent of the sitting part or respectively of the sitting surface can be increased and reduced in the longitudinal direction of the vehicle seat and can be adapted to different sizes of the vehicle occupants or respectively to different thigh lengths. During inflating of the air bellows and during discharging of air from the air bellows, irregular changes of shape of the air bellows can occur, for example owing to a lying on one another of a plastic film as walls of the air bellows. Particularly during the inflating of the air bellows, this leads to irregular movements of the movable sitting part element, despite a constant amount of air which is supplied to the air bellows per unit of time.

DE 36 31 872 C1 shows a vehicle seat with a backrest and with a seat cushion which is divided into a plurality of individual cushion elements separated in the transverse direction of the seat, which are connected with one another and are arranged so as to be displaceable with respect to one another in guides, extending in the longitudinal direction of the seat, for adjusting the seat depth, wherein the connection of the cushion elements with one another is carried out via a coupling mechanism engaging on the cushion elements, which is constructed such that the gaps occurring respectively on seat depth adjustment between the cushion elements have an approximately identical width in each seat adjustment position and the cushion elements are fixed in their respective adjustment position. Flexible air chambers are arranged here as air bellows between the individual cushion elements. The air chambers are connected to a compressed air system and can be supplied with air and discharged by a compressed air system by manual operation.

In addition, other objects, desirable features and characteristics will become apparent from the subsequent summary and detailed description, and the appended claims, taken in conjunction with the accompanying drawings and this background.

SUMMARY

The present disclosure provides a vehicle seat and a motor vehicle, in which the extent of the sitting surface of the sitting part can be altered in longitudinal direction of the vehicle seat with a constant movement speed on inflating the air bellows and discharging of air, in a technically simple manner at low costs.

In one exemplary embodiment, a vehicle seat, in particular for a motor vehicle, comprising a sitting part with a sitting surface, at least one air bellows arranged in the sitting part for altering the extent of the sitting surface in the longitudinal direction of the vehicle seat and a back part is provided. In addition, at least one guide element is arranged on the air bellows and is connected with the air bellows, and the guide element is mounted movably on at least one bearing part.

The air bellows, i.e. thereby walls, e.g. a plastic film, of the air bellows is thus held externally in its geometric shape by the guide element on inflating and on discharging of air. Thereby, on inflating and on discharging of air from the air bellows, a constant change of the extent of the sitting surface in longitudinal direction of the vehicle seat can be achieved as a function of time with a constant amount of air which is supplied into the air bellows or discharged. No irregular movements of a sitting part occur, because owing to the guidance with the guide element, an uncontrolled lying on one another of the walls of the air bellows does not substantially occur.

In particular, the guide element is an eye and/or the bearing part is a bearing rod.

In one exemplary embodiment, the guide element is a, generally substantially C-shaped, guide jaw and/or the bearing part is a, generally substantially T-shaped, bearing support which is substantially rod-shaped. The guide jaw is therefore mounted movably on the substantially T-shaped bearing support by means of a sliding bearing. In one exemplary embodiment a longitudinal axis of the bearing part is aligned substantially in longitudinal direction of the vehicle seat and/or several guide elements are mounted on the bearing part. The longitudinal axis of the bearing part is therefore aligned with a deviation of less than about 30°, about 20°, about 10° or about 5° to the longitudinal direction of the vehicle seat. Expediently, the longitudinal direction is aligned horizontally here.

In one exemplary embodiment, the guide element is mounted by a sliding bearing on the bearing part. A sliding bearing can be embodied particularly simply and at a favorable cost. For example, both the guide element and also the bearing part are constructed at least partially, in particular completely, from plastic, and the guide element slides on the bearing part. An eye as guide element has an opening and the bearing part, as bearing rod, is arranged therein.

Generally, the guide element is fastened on the upper side on the air bellows, so that the vertical position of the air bellows is substantially constant on the upper side in various states of filling of the air bellows. For example, by means of guide elements on the upper side, the air bellows can be held in its vertical position or respectively alignment in different states of filling of the air bellows. The air bellows can thereby not move downwards on the upper side, so that thereby the air bellows can not move downwards at its wall on the upper side, e.g. as plastic film, to a lower wall of the air bellows and thereby a lying on one another of the upper and lower wall of the air bellows can not occur.

In a variant, the air bellows is constructed on the upper side in the manner of a concertina. A construction of the air bellows on the upper side in the manner of a concertina on an upper wall enables a particularly controlled movement of the air bellows during the discharging of the air from the air bellows and during inflating. The wall of the air bellows on the upper side can thereby be folded in a controlled manner.

In another exemplary embodiment, the air bellows is constructed on the lower side and/or also laterally in the manner of a concertina.

Expediently, the guide element is fastened to the air bellows on the lower side, so that the vertical position of the air bellows on the lower side is substantially constant in various filling states of the air bellows. With a fastening of guide elements on the air bellows both on the lower side and also on the upper side, thereby the upper and lower wall of the air bellows can not lie on one another, so that thereby a uniform movement of sitting part elements or respectively an alteration of the extent of the sitting surface in longitudinal direction of the vehicle seat is ensured.

In one exemplary embodiment, the sitting part is divided into sitting part elements in transverse direction of the vehicle seat, and between at least two sitting part elements in each case an air bellows is arranged for moving at least one sitting part element in longitudinal direction of the motor vehicle.

In particular by means of the at least one air bellows on inflating of the air bellows with an air pump, the at least two sitting part elements are movable apart to increase the extent of the sitting surface in longitudinal direction of the vehicle seat, and by means of at least one elastic element, in particular a spring, the at least two sitting part elements are able to be moved together to reduce the extent of the sitting surface in longitudinal direction of the vehicle seat.

In one exemplary embodiment, the air bellows is divided by at least one dividing wall into partial air chambers. The dividing wall generally has an opening, so that thereby air can flow from one partial air chamber into another partial air chamber of the air bellows on inflating of the air bellows and on discharging of air from the air bellows.

In one exemplary embodiment, in longitudinal direction of the vehicle seat in front of the air bellows, a front movable sitting part is arranged and connected with the air bellows, and this sitting part is constructed as a movable support part, and generally the air bellows is at least partially arranged beneath the support part. Expediently, the support part has a covering wall here, and the air bellows is arranged at least partially beneath this covering wall of the support part.

In another exemplary embodiment, at least one sitting part element, in particular only one sitting part element, is movable in longitudinal direction of the vehicle seat, and/or the at least one movable sitting part element is movably mounted by a guide arrangement, in particular a guide track.

In one exemplary embodiment, the sitting part of the vehicle seat comprises two side guide elements, and the at least one sitting part element is arranged between the side guide elements and/or the back part comprises two back side guide elements.

Expediently, the vehicle seat comprises at least one inflatable seat air chamber and an air pump for inflating the at least one seat air chamber, and in addition the at least one air bellows is able to be inflated by the air pump. By means of the air pump, therefore, not only the at least one seat air chamber in the vehicle seat can be inflated, but also the respectively at least one air bellows, in particular between two sitting part elements. Advantageously, therefore, only one air pump is required for inflating both the at least one seat air chamber and also the at least one air bellows. Thereby, the costs of the vehicle seat are small and the vehicle seat is particularly simple to manufacture. On an inflating of the at least one air bellows, therefore, at least one sitting part element is moved forward in the motor vehicle in longitudinal direction of the vehicle seat, and thereby the extent of the sitting surface or respectively the extent of the sitting part is increased in the direction of the longitudinal direction of the vehicle seat. Vice versa, on a discharging of air of the air bellows, the extent of the sitting part or respectively of the sitting surface is reduced in the direction of the longitudinal direction of the vehicle seat.

In particular, the at least one seat air chamber is an inflatable lumbar support integrated into the back part, and/or the vehicle seat comprises at least one air duct and the air pump is connected pneumatically by the at least one air duct both with the at least one air bellows and also with the at least one seat air chamber. By means of the air duct, therefore, air can be directed from the air pump both to the seat air chamber and also to the at least one air bellows. Thereby, both the seat air chamber and also the at least one air bellows between the at least two sitting part elements are able to be inflated by the air pump, i.e. air is able to be conveyed by means of the air pump out from the environment into the seat air chamber, in particular lumbar support, and into the at least one air bellows.

In one exemplary embodiment, the vehicle seat comprises at least one valve, and by means of the at least one valve the at least one air bellows and/or the at least one seat air chamber is able to be connected pneumatically with the air pump. By means of the at least one valve, e.g. 3/2-way valve, the air can either be conveyed only into the at least one air bellows or only into the at least one seat air chamber from the air pump. Expediently, deviating herefrom, the air can also be conveyed simultaneously from the air pump into the at least one air bellows and into the at least one seat air chamber from the air pump.

In one exemplary embodiment, by means of the at least one valve the at least one seat air chamber, in particular lumbar support, and/or the at least one air bellows, is able to be discharged of air. The at least one valve and/or the air pump is therefore constructed to the effect that either air is able to be directed out from the at least one air bellows and/or from the at least one seat air chamber into the environment, and thereby a discharging of air of the at least one air bellows and/or of the at least one inflatable seat air chamber is able to be carried out. The deactivated air pump can be constructed to the effect that with an opened valve the air can escape out from the air bellows and/or the at least one seat air chamber through the air pump into the environment.

In particular, in each case at least one seat air chamber is integrated into the side guide elements and/or into the back side guide elements, and/or the at least one sitting part element, in particular the only one sitting part element movable in longitudinal direction of the vehicle seat, is or respectively are the foremost, in particular the only one foremost sitting part element in longitudinal direction of the vehicle seat.

In one exemplary embodiment, no cushion and/or no cover is arranged above the at least one sitting part element and/or above the at least one air bellows, or above the at least one sitting part element and/or above the at least one air bellows a cushion and/or a cover, e.g. a fabric or leather cover, is configured. The cushion is, for example, a foam mat. Generally, the at least one sitting part element comprises a cushion and a cover, so that the sitting surface is formed on the at least one sitting part element by the cover, e.g. a fabric cover. The air bellows, e.g. an air bellows of a plastic material, can optionally have a cushion and/or a cover in the region of the sitting surface, i.e. on the upper side.

In one exemplary embodiment, the seat air chamber is constructed as an inflatable air bag or an air bellows, generally of an, in particular elastic, plastic film.

Generally, cushions and/or a cover are configured on the back part and/or on the back side guide elements and/or on the side guide elements and/or on the sitting part elements.

A motor vehicle according to the present disclosure, with at least one vehicle seat is provided, wherein the vehicle seat is constructed as a vehicle seat described according to the teachings of the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
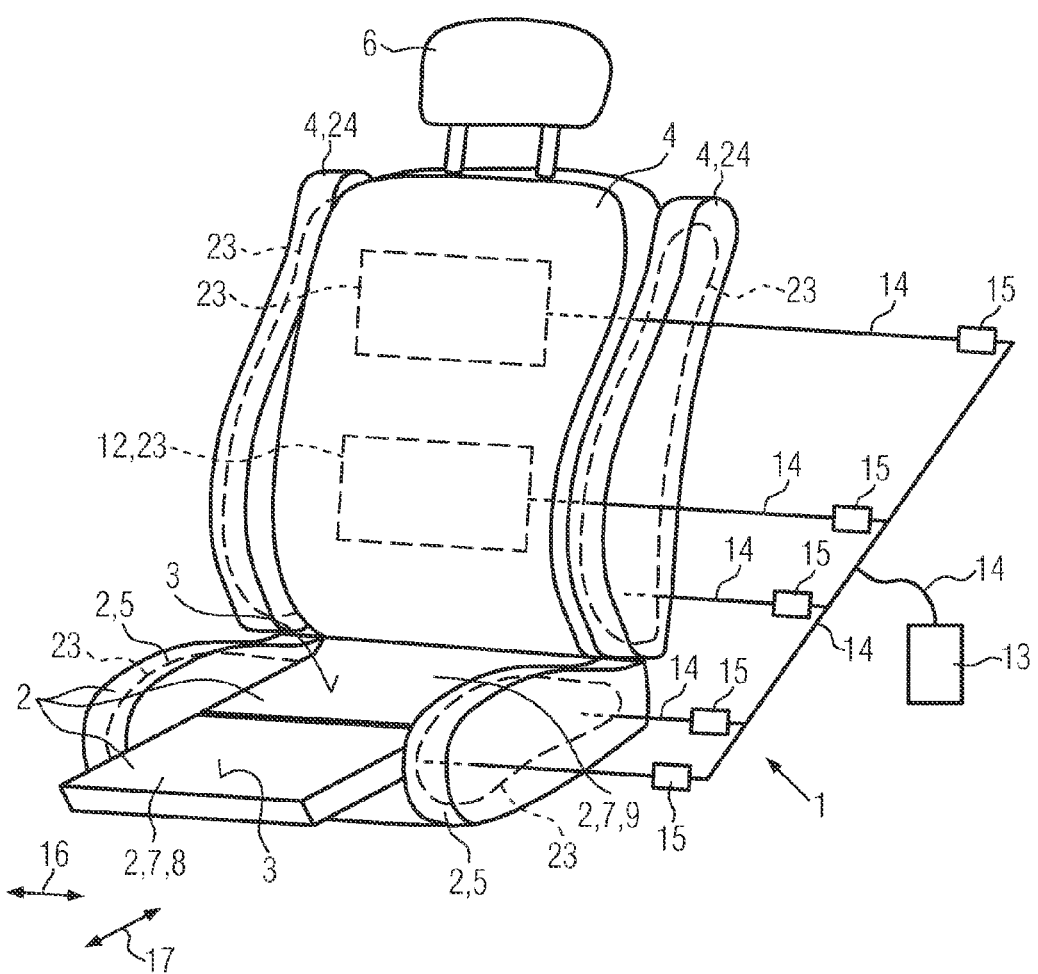
FIG. 1 is a perspective view of a vehicle seat.

A vehicle seat 1 illustrated in FIG. 1 is used for example as a front seat on the driver's or passenger's side, in order to receive persons within an interior of a motor vehicle 22 during the travelling of the motor vehicle 22. The vehicle seat 1 comprises a sitting part 2 with a sitting surface 3 and a back part 4. A headrest 6 is fastened on the upper side of the back part 4. The sitting part 2 comprises two sitting part elements 7, and between the two sitting part elements 7 an inflatable air bellows 10 (FIGS. 2 and 3) is arranged, which therefore encloses an air chamber. To the side of the two sitting part elements 7 and of the air bellows 10, side guide elements 5 are respectively present. Two back side guide elements 24 are arranged or integrated on the back part 4. The side guide elements 5 and the back side guide elements 24 serve to be able to receive transverse acceleration forces of an occupant on the vehicle seat 1 when the motor vehicle 22 is driving around a corner. The two sitting part elements 7 and the air bellows 10 are therefore present between the two side guide elements 5. The back part 4 is able to be swiveled in transverse direction about a swivel axis which is not represented. The swivel axis is therefore aligned parallel to a transverse direction 16 of the vehicle seat 1.

Figure 2:
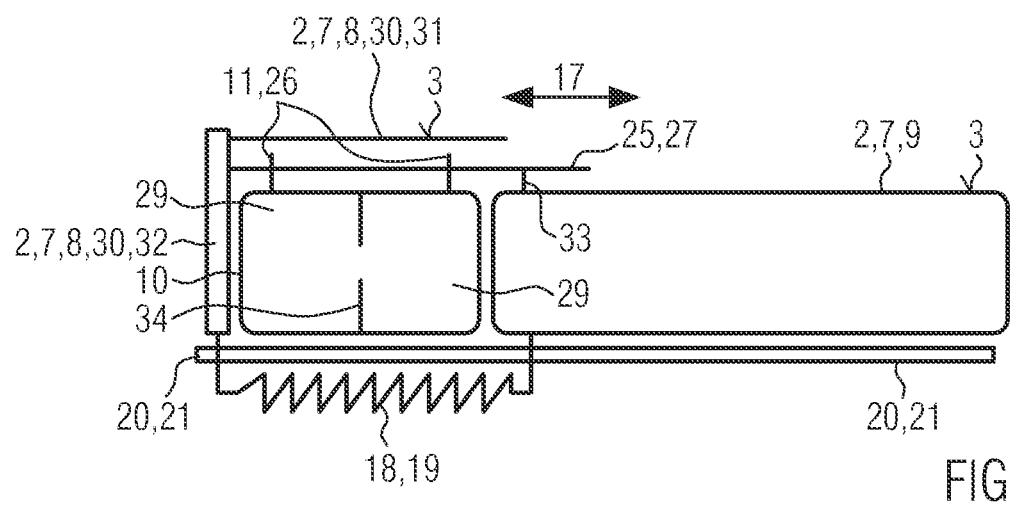
FIG. 2 is a vertical longitudinal section of a sitting part of the vehicle seat according to FIG. 1 in an extended position of a front movable sitting part element.
Figure 3:
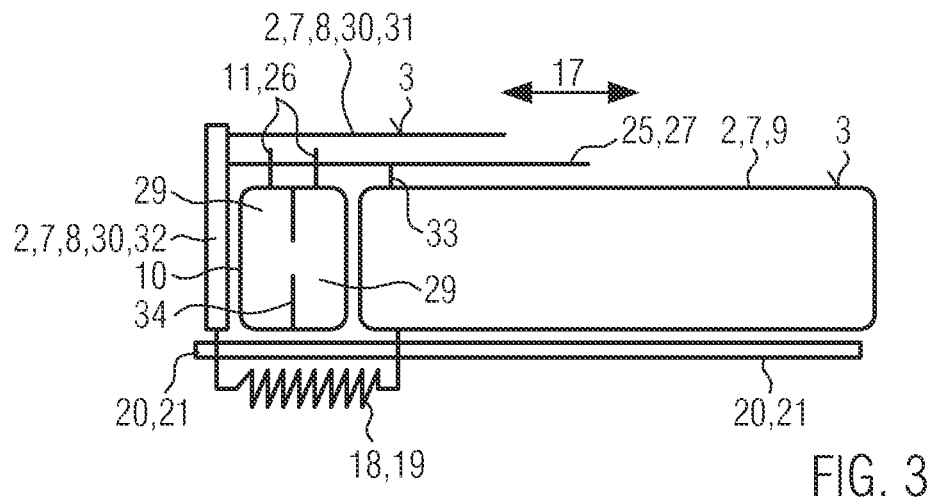
FIG. 3 is a vertical longitudinal section of the sitting part of the vehicle seat according to FIG. 1 in a retracted position of the front movable sitting part element.

In FIGS. 2 and 3 a vertical section of the sitting part 2 in longitudinal direction 17 is illustrated. The sitting part 2 comprises a front movable sitting part element 8 and the rear fixed sitting part element 9 as sitting part elements 7. The front movable sitting part element 8 is movably mounted on a guide arrangement 20, constructed as guide track 21, so that thereby the front sitting part element 8 is movable in the direction of the longitudinal direction 17. The rear sitting part element 9 is not movable. The air bellows 10 is arranged between the front and the rear sitting part element 8, 9. An elastic element 18, constructed as a spring 19, is fastened at a front end on the front sitting part element 8, and at a rear end of the spring 19, the latter is fastened on the remaining vehicle seat 1, e.g. on the rear fixed sitting part element 9 or on the guide track 21. The spring 19 applies a force onto the front sitting part element 8, which is aligned in the direction of the longitudinal direction 17 backwards in the direction to the rear sitting part element 9.

The vehicle seat 1 further comprises an air pump 13, and a lumbar support 12 is integrated, as an inflatable lumbar support 12, within the back part 4 (FIG. 1). In addition, inflatable seat air chambers 23 are integrated into the side guide elements 5, the back side guide elements 24 and the back part 4, for altering the size of the side guide elements 5, the back side guide elements 24 and the back part 4. The air pump 13 is connected pneumatically by means of air ducts 14 and valves 15 both with the air bellows 10 and also with the seat air chambers 23, in particular the lumbar support 12. The air ducts 14 are only partially illustrated in FIG. 1. The valves 15 are associated separately with the seat air chambers 23 and the air bellows 10, so that the air is able to be conveyed from the air pump 13 separately either into the inflatable seat air chambers 23 and/or into the air bellows 10. In addition, either the seat air chambers 23 and/or the air bellows 10 can be discharged of air separately by the valves 15.

In FIG. 2 an extended position of the front movable sitting part element 8 is illustrated, and in FIG. 3 a retracted position of the front movable sitting part element 8 is illustrated. To increase the extent of the sitting surface 3 of the sitting part 2, e.g. when an occupant with a large thigh length is sitting on the vehicle seat 1, air is conveyed into the air bellows 10 by the air pump 13 through the air duct 14. Thereby, the air bellows 10 increases substantially only its horizontal extent in the direction of the longitudinal direction 17, so that thereby the front sitting part element 8 is moved forward in the direction of the longitudinal direction 12 contrary to the force applied by the spring 19 onto the front sitting part element 8. Thereby, the front movable sitting part element 8 can be moved into different extended positions. If the air pump 13 is deactivated and the valve 15 for the air bellows 10 is switched to the effect that no air escapes from the air bellows 10, the front sitting part element 8 remains in an unchanged position. If the front movable sitting part element 8 is to be moved backwards again, the valve 15 for the air bellows 10 is to be switched to the effect that the air can escape out from the air bellows 10 through the air duct 14 and the valve 15 into the environment. Owing to the force applied by the spring 19 onto the front sitting part element 8, the front sitting part element 8 therefore moves again in a backwards direction in the direction of the longitudinal direction 17. Thereby, the sitting surface 3 can be adapted to occupants with a smaller thigh length.

The air bellows 10 is constructed on the upper side in the manner of a concertina and guide elements 11, as eyes 26, are fastened to the air bellows 10 on the upper side, i.e. on an upper wall, as plastic film of the air bellows 10. The eyes 26 are mounted movably here on a bearing rod 27 as bearing part 25. The eyes 26 and the bearing rod 27 of plastic therefore form a sliding bearing 28 for the movable bearing of the eyes 26 on the bearing rod 27. The front movable sitting part element 8 is constructed as a support part 30 and the bearing part 30 has a substantially vertically aligned front wall 32 and a substantially horizontally aligned covering wall 31. The covering wall 31 is not illustrated in FIGS. 4 and 5.

Figure 4:
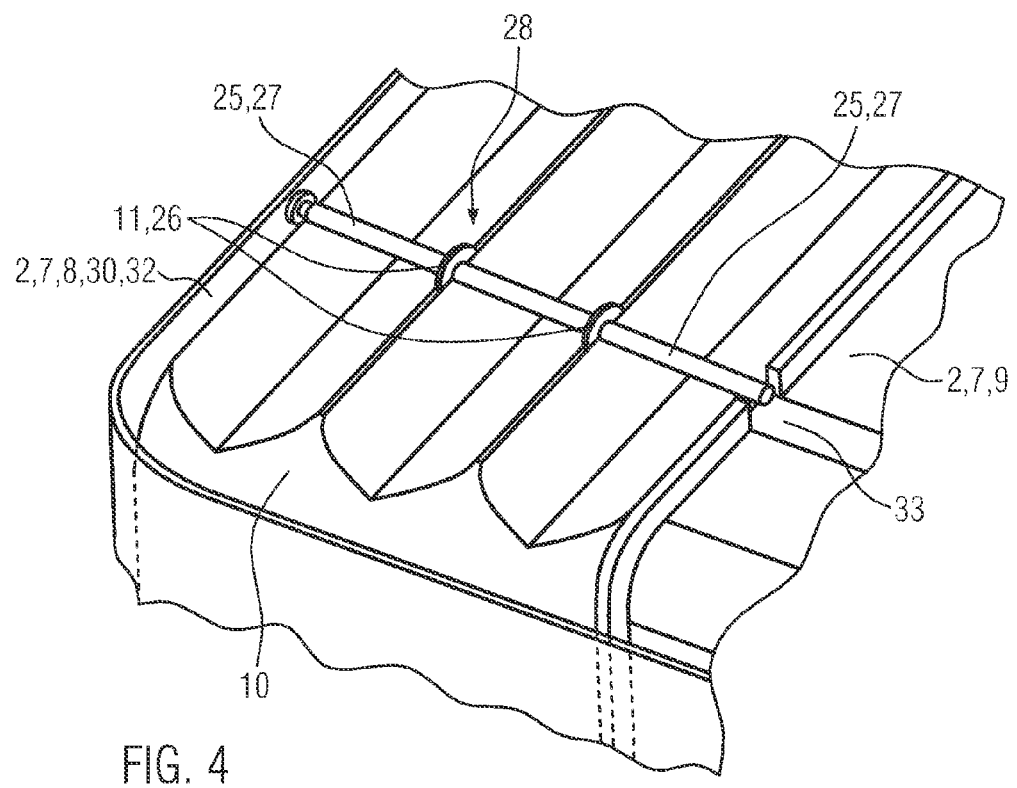
FIG. 4 is a perspective partial view of the air bellows and of the front movable sitting part element in an extended position.
Figure 5:
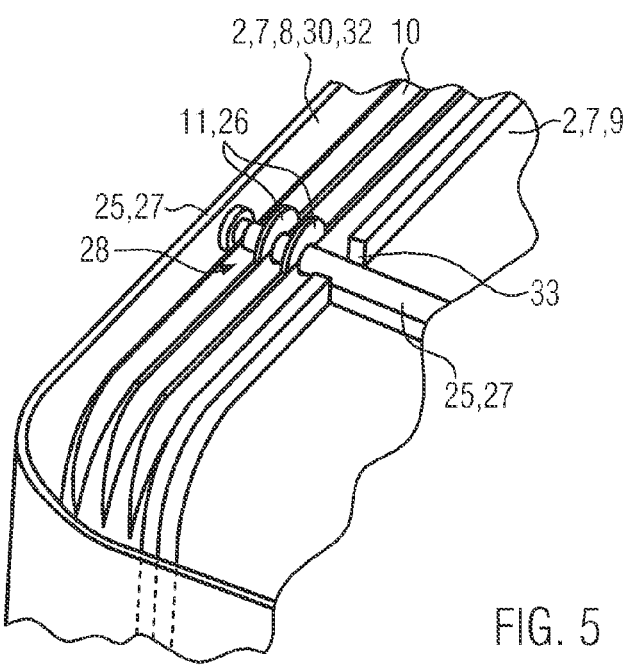
FIG. 5 is a perspective partial view of the air bellows and of the front movable sitting part element in a retracted position.
Figure 6:
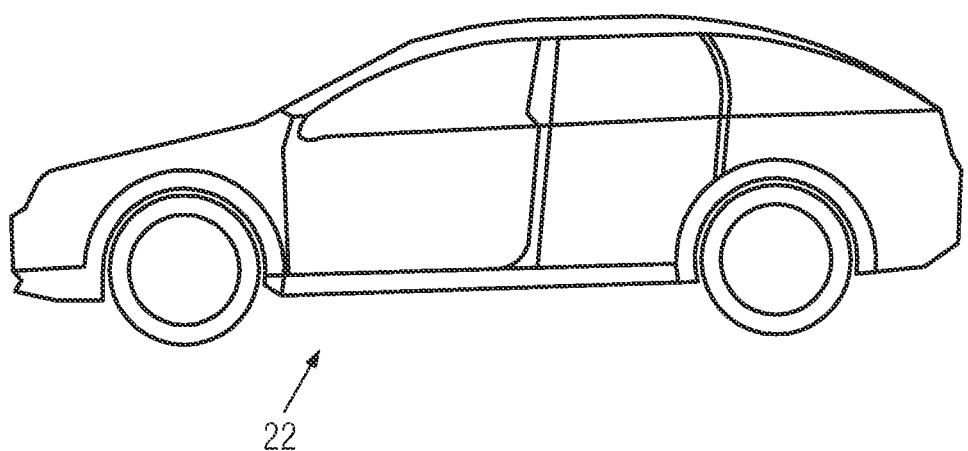
FIG. 6 is a side view of a motor vehicle.

The air bellows 10 has a dividing wall 34 and is thereby divided into two partial air chambers 29. The dividing wall 34 is provided here with an opening, so that an air-conducting connection exists between the two partial air chambers 29. The air bellows 10 is arranged in the longitudinal direction 17 between the rear fixed sitting part element 9 and the front movable sitting part element 8 as support part 30. In FIGS. 4 and 5 only one bearing rod 27 is illustrated, and a front end of the bearing rod 27 is securely connected with the front wall 32 of the bearing part 30. A bearing part guide 33 for the bearing rod 27 is constructed on the rear fixed sitting part element 9, on which the bearing rod 27 or respectively the bearing part 25 is movably mounted. In FIGS. 2 and 4 an extended position of the support part 30 or respectively an inflated air bellows 10 is illustrated, and in FIGS. 3 and 5 a retracted position of the support part 30 or respectively an air bellows 10 is illustrated, which is substantially emptied of air. The air bellows 10 is held on the upper side by means of the eyes 26 by the bearing rods 27, so that thereby the vertical alignment of the air bellows 10 on the upper side is substantially constant and at the same time also guided.

On the discharging of air from the air bellows 10 and on a movement of the support part 30 as front movable sitting part element 8 towards the rear, the bearing rods 27 are moved toward the rear owing to the connection with the front wall 32 of the support part 30, and also the eyes 26 move toward the rear with the folding together of the air bellows 10 and, in so doing, are held by the bearing rod 27. This movement is brought about by the spring 19 with an opened valve 15, so that thereby air can escape from the air bellows 10. On an inflating of the air bellows 10 with the air pump 13, the support part 30 is moved forward at a constant speed and thereby also the two bearing rods 27 owing to the connection with the front wall 32. The air bellows 10 is therefore guided in its movement on the upper side by means of the eyes 26 in a controlled manner and can substantially not carry out any vertical movement here. Thereby, a lying on one another of the air bellows 10 between the wall of the air bellows 10 on the upper side and lower side does not occur, so that thereby on inflating of the air bellows 10 and on discharging of air from the air bellows 10 a constant movement of the support part 30 is ensured.

The motor vehicle 22 comprises a control unit, which is not illustrated, and at least one actuating member, e.g. a lever or a knob, by means of which the air pump 13 and the valves 15 are able to be controlled. Thereby, the occupant of the motor vehicle 22 on the vehicle seat 1 can control whether the front movable sitting part element 8 is moved forward, is moved backward, or the position of the front sitting part element 8 is to remain constant. Also, the activating of the lumbar support 12 and of the seat air chambers 23 by means of inflating the lumbar support 12 and the seat air chambers 23 and the deactivating of the lumbar support 12 and the seat air chambers 23, by air being let out from the lumbar support 12 and the seat air chambers 23, can be thereby controlled by the occupants on the vehicle seat 1.

In one exemplary embodiment of the vehicle seat 1, which is not illustrated, the sitting part 2 comprises two or more than two movable sitting part elements 8. An air bellows 10 is arranged respectively between these movable sitting part elements 8 and a force is applied toward the rear in the direction of the longitudinal direction 17 onto these movable sitting part elements 8 by means of several elastic elements 19. Thereby, by means of inflating the air bellows 10, the movable sitting part elements 7 can be moved forward, and by means of discharging air from the air bellows 10 and the application of the force by means of the elastic elements 18 onto the movable sitting part elements 7, these can be moved toward the rear again. Expediently, this vehicle seat 1 which is not illustrated also comprises a fixed, non-movable sitting part element 7.

Regarded as a whole, essential advantages are connected with the vehicle seat according to the present disclosure. The air bellows 10 is guided on the upper side by means of the eyes 26 and the bearing rods 27, so that the air bellows 10 can carry out on the upper side a movement in the direction of the longitudinal direction 17, however no movement substantially in a vertical alignment on the upper side. Thereby, a lying on one another of walls of the air bellows 10 on the upper side and lower side does not occur. Thereby, a uniform movement of the support part 30 is ensured on inflating of the air bellows 10 and also on discharging of air from the air bellows 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A vehicle seat for a motor vehicle, comprising:
   a movable seat part with a sitting surface;
   a fixed seat part;
   at least one air bellows arranged between the movable seat part and the fixed seat part for altering the extent of the sitting surface in longitudinal direction of the vehicle seat upon inflating and deflating with air;
   at least one guide element formed by a plate element defining an aperture therethrough, the at least one guide element being secured to the at least one bellows; and
   at least one bearing rod extending between the movable seat part and the fixed seat part and through the aperature such that the at least one guide element is movably mounted on the at least one bearing rod.

2. The vehicle seat according to claim 1, wherein a longitudinal axis of the bearing part is aligned substantially in the longitudinal direction of the vehicle seat.

3. The vehicle seat according to claim 1, wherein the at least one guide element includes at least two guide elements.

4. The vehicle seat according to claim 1, wherein the at least one guide element is mounted with a sliding bearing on the at least one bearing part.

5. The vehicle seat according to claim 1, wherein the at least one guide element is fastened on the upper side on the at least one air bellows, so that the vertical position of the at least one air bellows on the upper side is substantially constant in various filling states of the at least one air bellows.

6. The vehicle seat according to claim 1, wherein the at least one air bellows includes an upper side forming a concertina.

7. The vehicle seat according to claim 1, wherein the at least one guide element is fastened on the lower side on the at least one air bellows so that the vertical position of the at least one air bellows on the lower side is substantially constant in various filling states of the at least one air bellows.

8. The vehicle seat according to claim 1, wherein, upon inflating the air bellows, the movable seat part and the fixed seat part are movable apart for increasing the extent of the sitting surface in longitudinal direction of the vehicle seat, and wherein the vehicle seat further comprises at least one spring coupled to the movable seat part and the fixed seat part that biases the movable seat part and the fixed seat part together to reduce the extent of the sitting surface in the longitudinal direction of the vehicle seat upon deflating the air bellows.

9. The vehicle seat according to claim 1, wherein the at least one air bellows is divided into partial air chambers by at least one dividing wall.

10. The vehicle seat according to claim 1, wherein a movable seat part is arranged at least partially in front of the at least one air bellows and at least partially above the at least one air bellows.

11. The vehicle seat according to claim 10, further comprising a guide track supporting the at least one movable seat part during the altering of the extent of the sitting surface.

12. The vehicle seat according to claim 1, further comprising two side guide elements, the sitting surface being arranged between the side guide elements.

13. A motor vehicle, comprising:
at least one vehicle seat having a movable seat part with a sitting surface, a fixed seat part, at least one air bellows arranged between the movable seat part and the fixed seat part for altering the extent of the sitting surface in longitudinal direction of the vehicle seat upon inflating and deflating with air, at least one guide element formed by a plate element defining an aperture therethrough, the at least one guide element being secured to the at least one bellows, and at least one bearing rod extending between the movable seat part and the fixed seat part and through the aperature such that the at least one guide element is movably mounted on the at least one bearing rod, wherein the at least one air bellows has an upper side forming a concertina.

14. The motor vehicle according to claim 13, wherein a longitudinal axis of the bearing part is aligned substantially in the longitudinal direction of the vehicle seat.

15. The motor vehicle according to claim 13, wherein the at least one guide element includes at least two guide elements mounted on the at least one bearing part.

16. The motor vehicle according to claim 13, wherein the at least one guide element is mounted with a sliding bearing on the at least one bearing part.

* * * * *